United States Patent
Morganson et al.

(10) Patent No.: US 11,268,404 B2
(45) Date of Patent: Mar. 8, 2022

(54) THERMAL INSULATION FEATURES FOR GAS TURBINE ENGINES

(71) Applicant: Raytheon Technologies Corporation, Farmington, CT (US)

(72) Inventors: David W. Morganson, Marlborough, CT (US); Lawrence A. Binek, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 53 days.

(21) Appl. No.: 16/881,781

(22) Filed: May 22, 2020

(65) Prior Publication Data
US 2021/0363897 A1    Nov. 25, 2021

(51) Int. Cl.
| | |
|---|---|
| *F01D 25/14* | (2006.01) |
| *F01D 9/00* | (2006.01) |
| *F02C 7/32* | (2006.01) |
| *B33Y 80/00* | (2015.01) |

(52) U.S. Cl.
CPC .............. *F01D 25/145* (2013.01); *F01D 9/00* (2013.01); *F02C 7/32* (2013.01); *B33Y 80/00* (2014.12); *F05D 2220/32* (2013.01); *F05D 2250/221* (2013.01); *F05D 2260/231* (2013.01); *F05D 2300/20* (2013.01)

(58) Field of Classification Search
CPC ... F02C 7/32; H05K 5/0073; B64D 29/00–06; B64D 27/04–20; B64D 27/26
See application file for complete search history.

(56) References Cited

U.S. PATENT DOCUMENTS

| | | | | |
|---|---|---|---|---|
| 4,826,397 | A | * | 5/1989 | Shook ...................... F01D 11/24 415/116 |
| 5,031,396 | A | * | 7/1991 | Margnelli ................. F02C 7/32 60/796 |
| 5,249,417 | A | * | 10/1993 | Duesler ..................... F02C 7/32 60/772 |
| 9,204,566 | B2 | * | 12/2015 | Balk .................... H05K 5/0213 |
| 2013/0258583 | A1 | * | 10/2013 | Balk ....................... G06K 1/20 361/679.48 |
| 2018/0156131 | A1 | * | 6/2018 | Olson .................... B64D 29/06 |
| 2019/0249570 | A1 | | 8/2019 | Barua et al. |
| 2020/0109668 | A1 | * | 4/2020 | Butcher ................ B33Y 80/00 |

(Continued)

FOREIGN PATENT DOCUMENTS

| | | | |
|---|---|---|---|
| CN | 105033188 A | * | 11/2015 |
| CN | 107742047 A | * | 2/2018 |

(Continued)

OTHER PUBLICATIONS

Analog Devices, "Thermal Design Basics" Accessed from https://www.analog.com/media/en/training-seminars/tutorials/MT-093.pdf on Sep. 8, 2021. (Year: 2009).*

(Continued)

*Primary Examiner* — Topaz L. Elliott
(74) *Attorney, Agent, or Firm* — Kinney & Lange, P.A.

(57) ABSTRACT

A hot section of a gas turbine engine includes a stator housing wall and an at least one insulating standoff attached to the stator housing wall, extending radially away from the stator housing wall. The hot section includes an accessory module attached to an opposite end of the at least one insulating standoff away from the stator housing wall.

15 Claims, 4 Drawing Sheets

(56) References Cited

U.S. PATENT DOCUMENTS

2020/0271011 A1* 8/2020 Comandore ............ F01D 21/00
2021/0207497 A1* 7/2021 Binek .................... F02C 3/145

FOREIGN PATENT DOCUMENTS

| | | | |
|---|---|---|---|
| CN | 111301717 A * | 6/2020 | |
| EP | 1876336 A2 | 1/2008 | |
| EP | 2628816 A1 | 8/2013 | |
| EP | 3379148 A1 | 9/2018 | |
| EP | 3848561 A1 | 7/2021 | |
| JP | 2019199051 A * | 11/2019 | ............ F01D 25/00 |
| WO | 2015077600 A1 | 5/2015 | |
| WO | WO-2020090959 A1 * | 5/2020 | ............ F01D 25/00 |

OTHER PUBLICATIONS

Extended European Search Report for EP Application No. 21174522.9, dated Oct. 4, 2021, 8 pages.

* cited by examiner

THERMAL INSULATION FEATURES FOR GAS TURBINE ENGINES

BACKGROUND

The present disclosure relates generally to gas turbine engines. More specifically, this disclosure relates to insulation standoffs attached to the casing of a gas turbine engine.

Aircraft with gas turbine engines can include, for example, Unpiloted (or Unmanned) Aerial Vehicles (UAVs) and expendable turbojet systems for guided munitions, missiles, and decoys. These aircraft are generally designed as limited lifetime vehicles, with expected lifetimes as short as a single use or single mission vehicle. As such, many components and features common in traditional piloted aircraft are unnecessary or can be simplified for these aircraft applications, such as the thermal blankets commonly included on traditional aircraft engines.

One of the main components of many simple gas turbine engines is a stator housing that encompasses a compressor, combustor, turbine, or a combination of these modules. As a result of the high gas temperatures and pressures generated by these modules, the stator housing functions as a pressure vessel and a thermal barrier to other components associated with the gas turbine engine. For example, external components mounted on a gas turbine engine can include those that contain or convey flammable fluids and the stator housing can operate above the auto-ignition temperatures of those flammable fluids. In the event of a leak or spill, the flammable fluids may combust, creating a safety critical fire hazard.

SUMMARY

A hot section of a gas turbine engine includes a stator housing wall and an at least one insulating standoff attached to the stator housing wall, extending radially away from the stator housing wall. The hot section includes an accessory module attached to an opposite end of the at least one insulating standoff away from the stator housing wall.

A method of manufacturing a gas turbine engine with an insulating standoff includes manufacturing a stator housing wall and manufacturing an at least one insulating standoff configured to be attached to the stator housing wall, extending radially away from the stator housing wall.

DETAILED DESCRIPTION

A gas turbine engine with integrally built insulation standoffs simplifies manufacturing. Even so, a gas turbine engine can leverage additive manufacturing techniques to improve various aspects of the gas turbine engine such as, for example, limited-life engines. Additive manufacturing allows the assembly details to be unitized, and simultaneously permits integration of many complex performance-enhancing features. The use of additive manufacturing to produce the engine reduces the time to delivery to the customer and lowers the overall production costs of the unit.

Disclosed herein is a gas turbine engine with integrally built insulation standoffs configured to maintain the temperature of the accessory module below the auto-ignition temperature of any flammable fluids, generally accepted as 450° F. (232° C.). Many gas turbine engine systems include thermal blankets, which are typically much less dense than metallic stator housings, but are applied at a thickness 5-10 times that of the metallic housing. On the whole, thermal blankets can add 10-50% of the weight of the stator housing they are insulating. Building an integrally built insulation standoff obviates the need to provide such a thermal blanket on the exterior of the stator housing, eliminating the need for cumbersome installation, reducing overall system weight, and simplifying ongoing maintenance.

Figure 1:
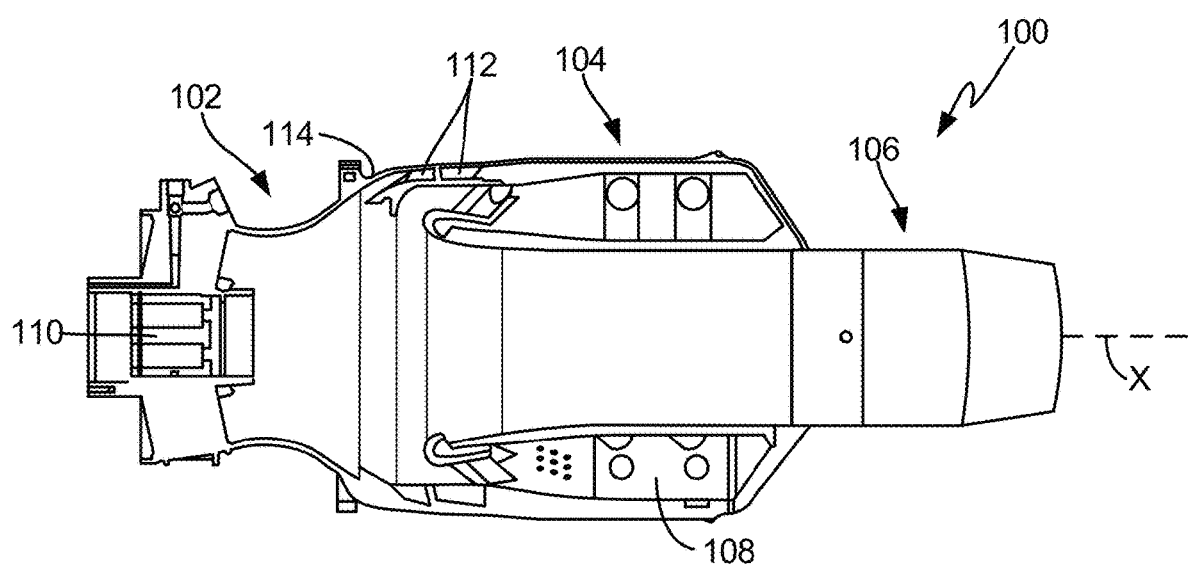
FIG. 1 is a cross-sectional view of a gas turbine engine.

FIG. 1 is a cross-sectional view of a gas turbine engine. FIG. 1 shows gas turbine engine 100 including compressor section 102, hot section 104, exhaust section 106, combustor 108, rotor 110, stators 112, stator housing wall 114, and axis of rotation X. In the illustrated embodiment, gas turbine engine 100, which may be an attritable or limited-life engine, shows compressor section 102 lying forward and adjacent to hot section 104, which is positioned forward of exhaust section 106. Although combustor 108 lies physically aft of hot section 104, combustor 108 fluidically sits between compressor section 102 and hot section 104. This arrangement may be referred to as a reverse flow combustor. Rotor 110 extends along the axis of rotation X into both compressor section 102 and hot section 104. Stators 112 are attached to stator housing wall 114 and positioned in a compressed air flow path between compressor section 102 and combustor 108.

Operationally, air enters the forward end of compressor section 102 and is compressed by compressor blades and vanes. Compressed air flows around stators 112 and is retained inside the compressed air flow path by stator housing wall 114. Compressed air and fuel enter combustor 108 where the compressed air and fuel are mixed and ignited. The resulting high-temperature gas from the combustor enters hot section 104 and drives the rotation of turbine blades, which in turn generates power by turning rotor 110 circumferentially about axis of rotation X. Gas exits gas turbine engine 100 out of the aft end of exhaust section 106.

Gas turbine engine 100 can be additively manufactured using techniques such as laser powder bed fusion, electron beam melting, direct energy deposition, and binder jetting. The additive manufacturing process can use any suitable material, including without limitation metals, alloys, and ceramic based materials that can tolerate the high temperature and pressure environment of a gas turbine engine for the expected useable life of the vehicle, such as, for example, nickel based alloys like Inconel® 625. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind.

For example, a thermal barrier layer or coating can be applied to the metal or alloy to extend the useful life of the gas turbine engine.

Figure 2:
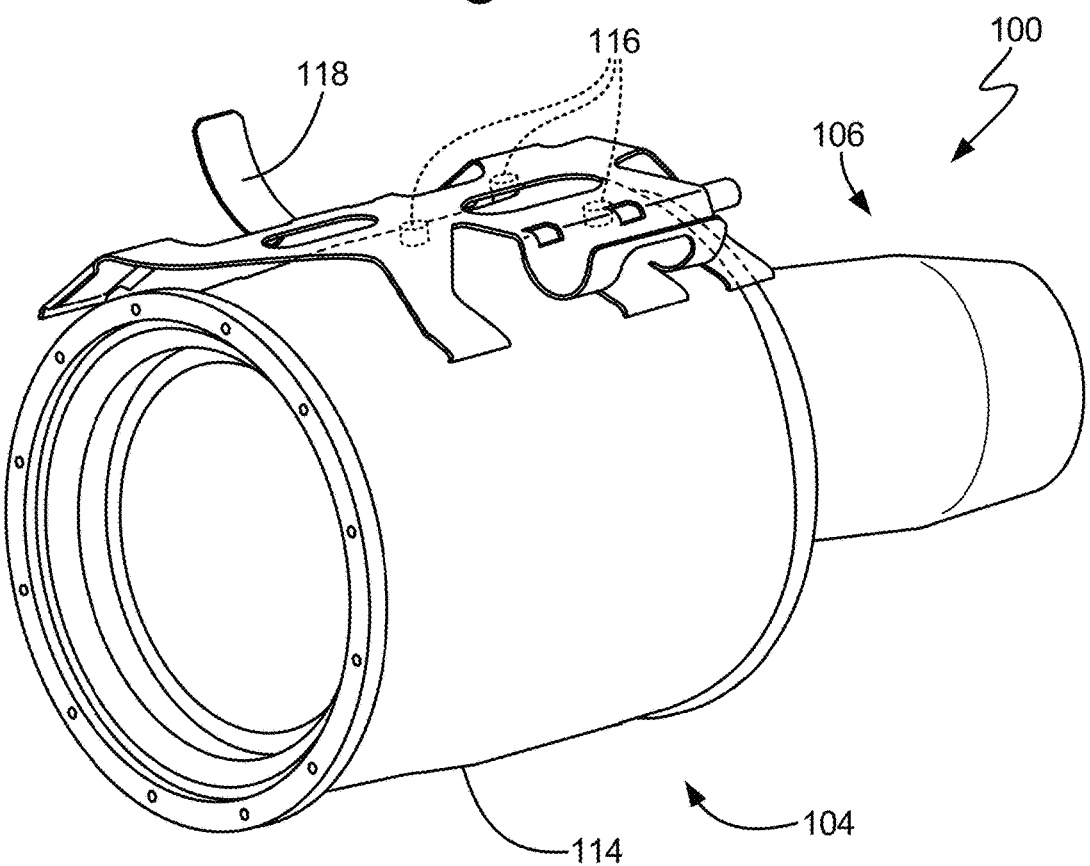
FIG. 2 is a perspective view of a hot section of a gas turbine engine.

FIG. 2 is a perspective view of a hot section of a gas turbine engine. FIG. 2 shows gas turbine engine 100, hot section 104, exhaust section 106, stator housing wall 114, insulation standoffs 116, and accessory module 118. Hot section 104 of gas turbine engine 100 is adjacent to and circumferentially surrounds part of exhaust section 106. Hot section 104 is also fluidically connected forward of exhaust section 106. Stator housing wall 114 of hot section 104 encases combustor 108 and stators 112 (shown in FIG. 1).

Insulation standoffs 116 can be integrally formed and conformal with stator housing wall 114. As used herein, the term "integrally formed" means manufactured as a single unitized part. As used herein, the term "conformal with" means to generally follow the shape of. For example, insulation standoffs 116 can be additively manufactured together with hot section 104 forming a single unitized manufactured part. Alternatively, insulation standoffs 116 can be manufactured separately from stator housing wall 114 and attached during the assembly process such as, for example, using welding or epoxy processes, riveting the parts together by adding an additional part or providing a rivet stud and rivet aperture during manufacturing, or using a band clamp assembly, a cotter pin assembly, a push nut assembly, or any other suitable joining method known in the art. Although insulation standoffs 116 are depicted in FIGS. 2, 3, 4A, and 4B, as having a cylindrical shape, insulation standoffs 116 can have any shape that thermally insulates accessory module 118 from hot section 104 and simultaneously withstands the vibrational and thermal stress of gas turbine engine 100 during use.

Accessory module 118 can house or be an attachment site for various parts associated with gas turbine engine 100 such as, for example, a fuel tank, fuel pump, electronics, and pyrotechnics for kick starting gas turbine engine 100. Accessory module 118 can be integrally formed and conformal with insulation standoffs 116 at an end opposite to the site of attachment between stator housing wall 114 and insulation standoffs 116. Alternatively, accessory module 118 can be manufactured separately from insulation standoffs 116 and attached during the assembly process such as, for example, using welding or epoxy processes, riveting the parts together by adding an additional part or providing a rivet stud and rivet aperture during manufacturing, or using a band clamp assembly, a cotter pin assembly, a push nut assembly, or any other suitable joining method known in the art.

Figure 3:
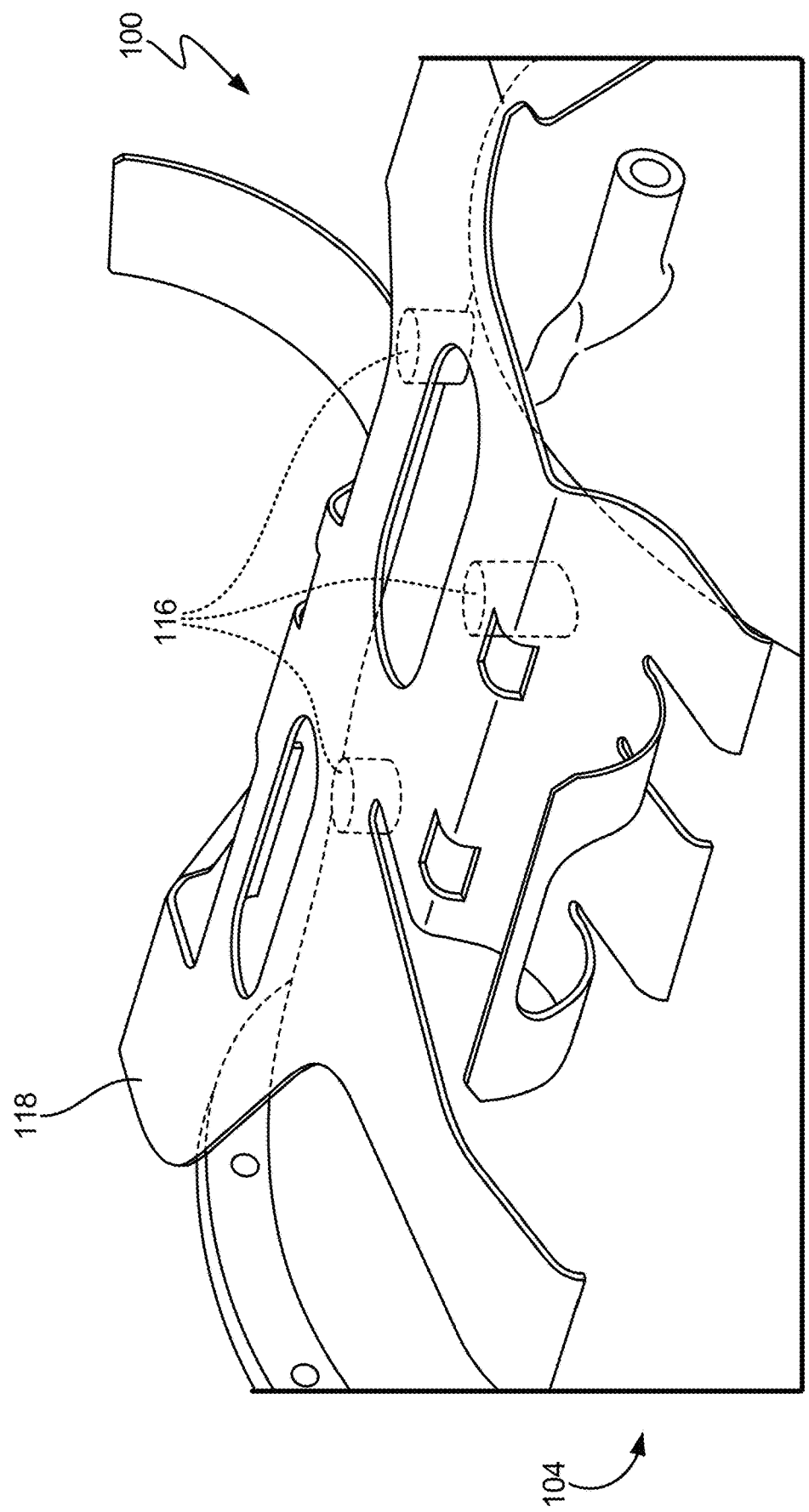
FIG. 3 is a perspective partial view of the hot section with insulation features.

FIG. 3 is a perspective partial view of hot section 104 with insulation standoffs 116. FIG. 3 shows gas turbine engine 100, hot section 104, stator housing wall 114, insulation standoffs 116, and assembly module 118. Stator housing wall 114 of hot section 104 encases combustor 108 and stators 112 (shown in FIG. 1). Insulation standoffs 116 can be integrally formed and conformal with stator housing wall 114 and extend radially away from stator housing wall 114. Alternatively, insulation standoffs 116 can be manufactured separately from stator housing wall 114 and attached during the assembly process.

Accessory module 118 can be integrally formed and conformal with insulation standoffs 116 at an end opposite to the site of attachment between stator housing wall 114 and insulation standoffs 116. Alternatively, accessory module 118 can be manufactured separately from insulation standoffs 116 and attached during the assembly process. Although three insulation standoffs are depicted in FIG. 3, other numbers of insulation standoffs can be used such as, for example, one, two, four, six, seven, ten, fifteen, twenty, or any number in between. Stator housing wall 114, insulation standoffs 116, and accessory module 118 can all be formed of the same material or each can be formed of a different material. However, using three or more insulation standoffs compared to using one or two insulation standoffs reduces the amount of vibrational stress experienced by stator housing wall 114, insulation standoffs 116, and accessory module 118 during operation of gas turbine engine 100.

In some embodiments, insulation standoffs 116 have a diameter from 0.33 inches to 0.50 inches, inclusive. In some embodiments, insulation standoffs 116 extend radially away from stator housing wall 114 from 0.25 inches to 2.00 inches, inclusive. Although insulation standoffs 116 can also have other diameters and radial length extensions, these geometric parameters and other possible shapes are limited by factors such as, for example, vibrational effects experienced by stator housing wall 114, insulation standoffs 116, and accessory module 118 during use of gas turbine engine 100, the amount of heat transferred between stator housing wall 114 and accessory module 118 during use of gas turbine engine 100, the weight of insulation standoffs 116, and the compactness of the overall build of gas turbine engine 100.

Figure 4A:
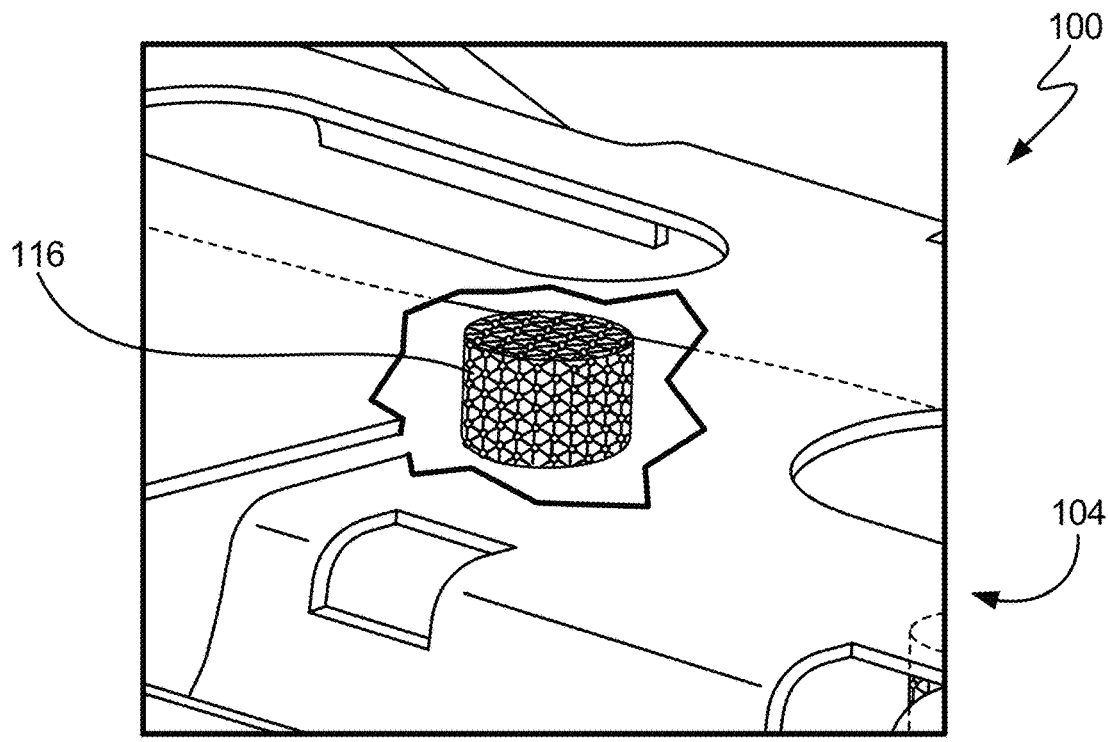
FIG. 4A is a perspective view of an insulation feature lattice network.

FIG. 4A is a perspective view of an insulation feature lattice network. FIG. 4A shows gas turbine engine 100, hot section 104, stator housing wall 114, insulation standoff 116, and lattice network 116a. FIG. 4A depicts partially built insulation standoff 116 attached to stator housing wall 114 of hot section 104. Partially built insulation standoff 116 includes a repeating spar assembly (shown in FIG. 5) forming lattice network 116a, which provides structural support to insulation standoff 116 throughout the manufacturing process.

Figure 4B:
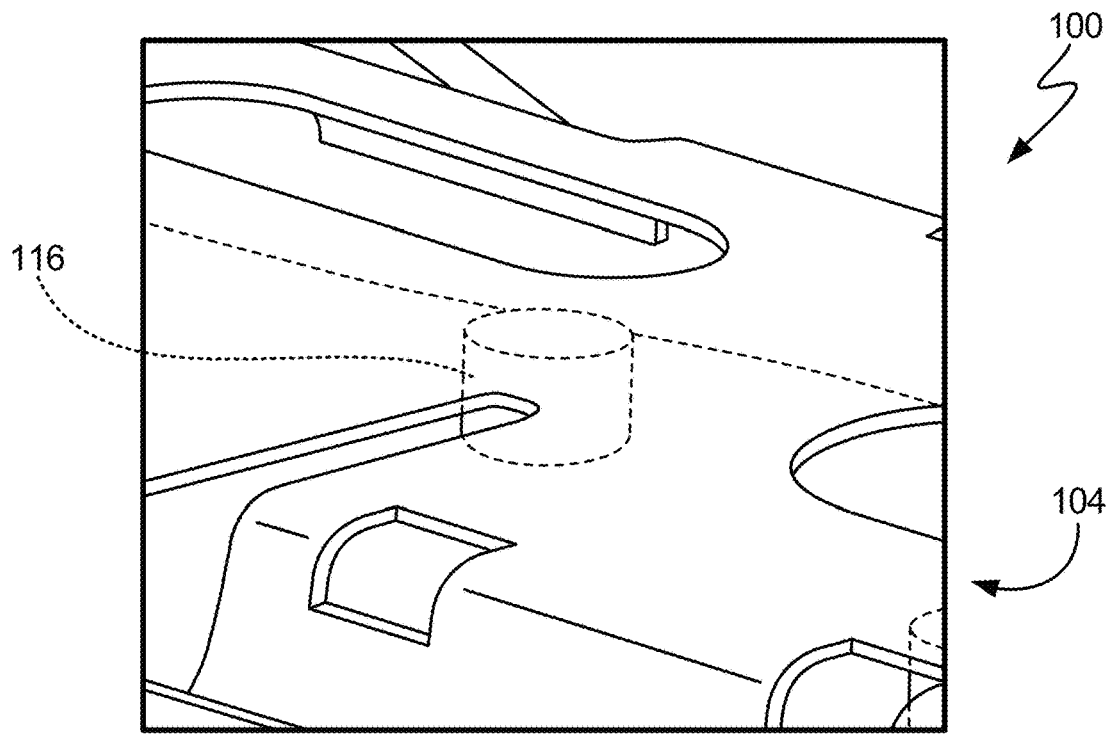
FIG. 4B is a perspective view of an insulation feature lattice network with ceramic infiltration.

FIG. 4B is a perspective view of an insulation feature lattice network with ceramic infiltration. FIG. 4B shows gas turbine engine 100, hot section 104, stator housing wall 114, and insulation standoff 116. FIG. 4A depicts insulation standoff 116 attached to stator housing wall 114 of hot section 104. Insulation standoff 116 includes lattice network 116a (shown in FIG. 4A) with ceramic infiltration. Insulation standoff 116 can include walls to retain the ceramic infiltrate until the ceramic infiltrate cures. Any ceramic infiltrate can be used such as, for example, oxides and nitrides that can withstand the vibrational and thermal stress produced by gas turbine engine 100 under load. In one embodiment, the ceramic infiltrate is a bentonite slurry. Advantageously, lattice network 116a with a ceramic infiltrate transfers heat from stator housing wall 114 to accessory module 118 less efficiently compared to a fully densified metallic structure having a similar size and shape.

Figure 5:
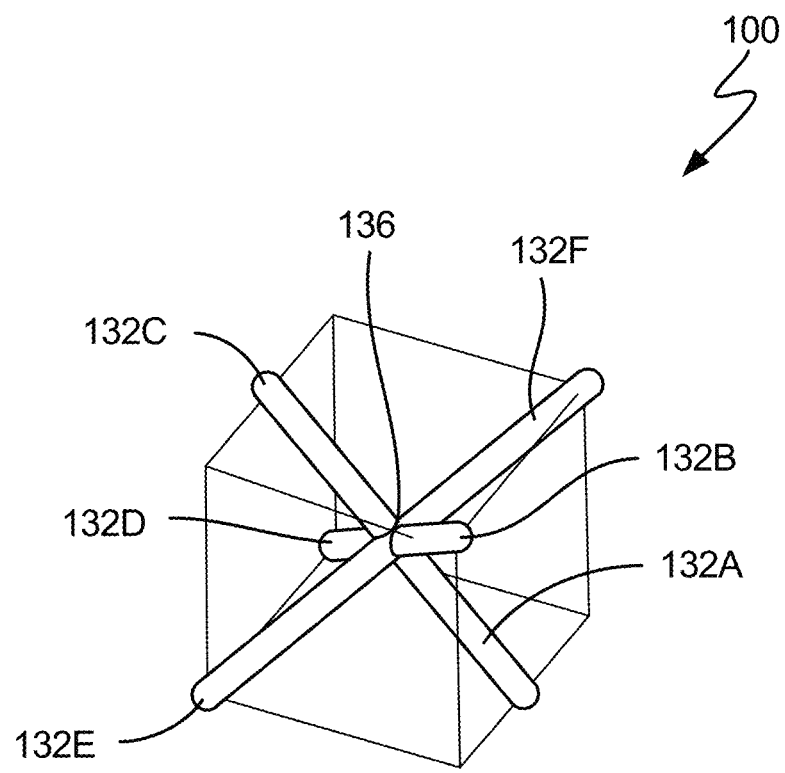
FIG. 5 is a perspective view of one embodiment of a repeating spar assembly.

FIG. 5 is a perspective view of one embodiment of a repeating spar assembly. FIG. 5 shows spar assembly 138 including spars 132A, 132B, 132C, 132D, 132E, and 132F, and center point 136. In the illustrated embodiment, there are six spars 132 radially extending from a center point 136. Adjacent spars 132, for example spars 132A and 132B, lie at substantially 90° angles to one another. The ends of any three adjacent spars 132, for example spars 132A, 132B, and 132E, which are at an opposing end to center point 136, can form an abstract triangle. Taking all eight sets of three adjacent spars 132 and the resulting abstract triangle from each set of three adjacent spars 132 forms an abstract 3-dimensional shape, which can referred to as a square bipyramid.

Each spar 132 can have, for example, a diameter of 0.01 inches (0.25 mm). In other embodiments, each spar 132 can have a diameter from 0.005 inches (0.13 mm) to 0.02 inches (0.51 mm), inclusive. In other embodiments, each spar 132 can have a diameter smaller than 0.005 inches (0.13 mm). In other embodiments, each spar 132 can have a diameter larger than 0.02 inches (0.51 mm). Each spar 132 can have a length of 0.05 inches (1.3 mm). In other embodiments, each spar 132 can have a length from 0.03 inches (0.76 mm) to 0.1 inches (2.5 mm), inclusive. In other embodiments, each spar 132 can have a length smaller than 0.03 inches (0.76 mm). In other embodiments, each spar 132 can have a length larger than 0.1 inches (2.5 mm).

In other embodiments, spar assembly 138 includes more than six spars 132. In other embodiments, spar assembly 138 includes fewer than six spars 132. In other embodiments, two adjacent spars 132 can lie at an angle more than 90° from one another. In other embodiments, two adjacent spars 132 can lie at an angle from 45° to 90° from one another.

A gas turbine engine with integrally built insulation standoffs configured to maintain the temperature of the accessory module below the auto-ignition temperature of any flammable fluids, generally accepted as 450° F. (232° C.) eliminates the need for a thermal blanket. Many gas turbine engine systems include thermal blankets, which are typically much less dense than metallic stator housings, but are applied at a thickness 5-10 times that of the metallic housing. On the whole, thermal blankets can add 10-50% of the weight of the stator housing they are insulating. As such, the integrally built insulation standoff obviates the need to provide a thermal blanket on the exterior of the stator housing, eliminating the need for cumbersome installation, reducing overall system weight, and simplifying ongoing maintenance.

Discussion of Possible Embodiments

The following are non-exclusive descriptions of possible embodiments of the present invention.

A hot section of a gas turbine engine includes a stator housing wall and an at least one insulating standoff attached to the stator housing wall extending radially away from the stator housing wall. The hot section includes an accessory module attached to an opposite end of the at least one insulating standoff away from the stator housing wall.

The hot section of the preceding paragraph can optionally include, additionally and/or alternatively, any one or more of the following features, configurations and/or additional components:

The at least one insulating standoff is formed of a lattice network.

The lattice network is formed of a repeating network of spar assemblies.

Each spar assembly has a cubic shape.

Each spar has a diameter from 0.005 inches (0.13 mm) to 0.02 inches (0.51 mm), inclusive.

Each spar has a length from 0.03 inches (0.76 mm) to 0.1 inches (2.5 mm), inclusive.

The lattice network of spars is infiltrated with a ceramic material.

The at least one insulating standoff is integral and conformal with the stator housing wall.

The at least one insulating standoff maintains an external temperature of the accessory module at or below 450° F. (232° C.) during operation of the engine.

A method of manufacturing a gas turbine engine with an insulating standoff includes manufacturing a stator housing wall and manufacturing an at least one insulating standoff configured to be attached to the stator housing wall, extending radially away from the stator housing wall.

The method of the preceding paragraph can optionally include, additionally and/or alternatively, any one or more of the following features, configurations and/or additional components:

The at least one insulating standoff is manufactured integrally and conformally with the stator housing wall using an additive manufacturing process.

The method includes manufacturing an accessory module attached to an opposite end of the at least one insulating standoff away from the stator housing wall.

The at least one insulating standoff is a lattice network formed of a repeating network of spar assemblies.

Each spar assembly has a cubic shape.

Each spar has a diameter from 0.005 inches (0.13 mm) to 0.02 inches (0.51 mm), inclusive.

Each spar has a length from 0.03 inches (0.76 mm) to 0.1 inches (2.5 mm), inclusive.

The method includes infiltrating the lattice network of spars with a ceramic material.

The method includes configuring the insulation standoff to maintain an external temperature of the accessory module at or below 450° F. (232° C.) during operation of the engine.

A hot section of a gas turbine engine includes a stator housing wall and an at least one insulating standoff integrally and conformally attached to the stator housing wall, extending radially away from the stator housing wall. The at least one insulating standoff is formed of a lattice network of spar assemblies and the lattice network of spars is infiltrated with a ceramic material. The hot section includes an accessory module attached to an opposite end of the at least one insulating standoff from the stator housing wall.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hot section of a gas turbine engine, the hot section comprising:
   a stator housing wall;
   an at least one insulating standoff attached to the stator housing wall and extending radially away from the stator housing wall, wherein the at least one insulating standoff is formed of a lattice network of spars and the lattice network of spars is infiltrated with a ceramic material; and
   an accessory module attached to an opposite end of the at least one insulating standoff away from the stator housing wall.

2. The hot section of claim 1, wherein the lattice network is formed of a repeating network of spar assemblies comprising spars.

3. The hot section of claim 2, wherein each spar assembly has a cubic shape.

4. The hot section of claim 3, wherein each spar has a diameter from 0.005 inches (0.13 mm) to 0.02 inches (0.51 mm), inclusive.

5. The hot section of claim 3, wherein each spar has a length from 0.03 inches (0.76 mm) to 0.1 inches (2.5 mm), inclusive.

6. The hot section of claim 1, wherein the at least one insulating standoff is integral and conformal with the stator housing wall.

7. The hot section of claim 1, wherein the at least one insulating standoff maintains an external temperature of the accessory module at or below 450° F. (232° C.) during operation of the engine.

8. A method of manufacturing a gas turbine engine with an insulating standoff, the method comprising:
manufacturing a stator housing wall;
manufacturing at least one insulating standoff configured to be attached to the stator housing wall such that the at least one insulating standoff extends radially away from the stator housing wall;
manufacturing an accessory module attached to an opposite end of the at least one insulating standoff away from the stator housing wall; and
infiltrating a lattice network of spars with a ceramic material, wherein the at least one insulating standoff comprises the lattice network of spars.

9. The method of claim 8, wherein the at least one insulating standoff is manufactured integrally and conformally with the stator housing wall using an additive manufacturing process.

10. The method of claim 8, wherein the lattice network of spars is formed of a repeating network of spar assemblies.

11. The method of claim 10, wherein each spar assembly has a cubic shape.

12. The method of claim 11, wherein each spar has a diameter from 0.005 inches (0.13 mm) to 0.02 inches (0.51 mm), inclusive.

13. The method of claim 11, wherein each spar has a length from 0.03 inches (0.76 mm) to 0.1 inches (2.5 mm), inclusive.

14. The method of claim 8, further comprising configuring the insulating standoff to maintain an external temperature of the accessory module at or below 450° F. (232° C.) during operation of the engine.

15. A hot section of a gas turbine engine, the hot section comprising:
a stator housing wall;
an at least one insulating standoff integrally and conformally attached to the stator housing wall, extending radially away from the stator housing wall, wherein the at least one insulating standoff is formed of a lattice network of spar assemblies and wherein the lattice network of spars is infiltrated with a ceramic material; and
an accessory module attached to an opposite end of the at least one insulating standoff from the stator housing wall.

* * * * *